United States Patent
Seletskiy et al.

(10) Patent No.: US 12,101,315 B2
(45) Date of Patent: *Sep. 24, 2024

(54) SYSTEMS AND METHODS FOR RAPID PASSWORD COMPROMISE EVALUATION

(71) Applicant: Cloud Linux Software Inc., Estero, FL (US)

(72) Inventors: Igor Seletskiy, Palo Alto, CA (US); Serhii Polishchuk, Odessa (UA); Marat Sataiev, Zhaporozhie (UA)

(73) Assignee: Cloud Linux Software Inc., Estero, FL (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/872,156

(22) Filed: Jul. 25, 2022

(65) Prior Publication Data

US 2023/0082633 A1    Mar. 16, 2023

Related U.S. Application Data

(63) Continuation-in-part of application No. 17/472,788, filed on Sep. 13, 2021.

(51) Int. Cl.
*H04L 9/40* (2022.01)
*G06F 21/46* (2013.01)

(52) U.S. Cl.
CPC .......... *H04L 63/0846* (2013.01); *G06F 21/46* (2013.01); *H04L 63/0218* (2013.01); *H04L 63/0236* (2013.01); *H04L 63/1425* (2013.01)

(58) Field of Classification Search
CPC ............. H04L 63/0209; H04L 63/0236; H04L 63/0245; H04L 63/083; H04L 63/102;
(Continued)

(56) References Cited

U.S. PATENT DOCUMENTS 11,853,288 B1 * 12/2023 Gogoi ................. G06F 16/2255
2003/0177364 A1 * 9/2003 Walsh ..................... G06F 21/41
713/182

(Continued)

OTHER PUBLICATIONS

Alsaleh et al. "Revisiting Defenses against Large-Scale Online Password Guessing Attacks" [Online], Feb. 2012 [Retrieved on: Jan. 10, 2024], IEEE, Retrieved from: < https://ieeexplore.ieee.org/stamp/stamp.jsp?tp=&arnumber=5766003 > (Year: 2012).*

(Continued)

*Primary Examiner* — Eric W Shepperd
(74) *Attorney, Agent, or Firm* — ArentFox Schiff LLP; Michael Fainberg

(57) ABSTRACT

Disclosed herein are systems and methods for rapid password evaluation. A method may include: configuring a web application firewall (WAF) to monitor login credentials for one or more web applications; intercepting, using the WAF, a password input during a login attempt to a web application by an entity; calculating a hash value of the password input; transmitting the hash value to a dedicated server configured to: determine whether the hash value is in a database of hashes corresponding to weak passwords; and in response to determining that the hash value is in the database of hashes, transmit a message to the WAF indicating that the password input corresponds to a weak password; and generating for display, using the WAF, a web page prompting for a password reset for the web application.

18 Claims, 8 Drawing Sheets

(58) Field of Classification Search
CPC ............. H04L 63/1416; H04L 63/1425; H04L 9/3226; G06F 21/31; G06F 21/46; G06F 21/55; G06F 21/552; G06F 21/554
See application file for complete search history.

(56) References Cited

U.S. PATENT DOCUMENTS

| | | | | |
|---|---|---|---|---|
| 2006/0036871 | A1* | 2/2006 | Champine | H04L 9/0866 713/181 |
| 2007/0250917 | A1* | 10/2007 | Bruchertseifer | H04W 12/02 726/5 |
| 2009/0055910 | A1* | 2/2009 | Lee | H04L 9/3271 726/6 |
| 2010/0299731 | A1* | 11/2010 | Atkinson | H04L 63/0846 726/6 |
| 2012/0110668 | A1* | 5/2012 | Schechter | G06F 21/46 726/25 |
| 2012/0239916 | A1* | 9/2012 | Malasani | H04W 12/50 713/1 |
| 2014/0317705 | A1* | 10/2014 | Eluard | G06F 21/31 726/6 |
| 2015/0172272 | A1* | 6/2015 | Levner | H04L 63/083 726/7 |
| 2019/0036940 | A1* | 1/2019 | Balakrishnan | H04L 63/12 |
| 2019/0190934 | A1* | 6/2019 | Peppe | H04L 63/1441 |
| 2020/0137096 | A1* | 4/2020 | Endler | H04L 63/083 |
| 2020/0145423 | A1* | 5/2020 | Singh | G06F 16/2379 |
| 2020/0329025 | A1* | 10/2020 | Kahn | H04L 63/0838 |
| 2021/0021461 | A1* | 1/2021 | Schwartz | H04L 43/16 |
| 2021/0117533 | A1* | 4/2021 | Malka | H04L 9/008 |
| 2021/0182379 | A1* | 6/2021 | Sanchez | H04L 63/123 |
| 2021/0243207 | A1* | 8/2021 | Crume | G06F 16/2255 |
| 2021/0288981 | A1* | 9/2021 | Numainville | H04L 63/1416 |
| 2021/0306315 | A1* | 9/2021 | Wright | G06F 21/45 |
| 2021/0374226 | A1* | 12/2021 | Mondello | G06F 21/46 |
| 2021/0409411 | A1* | 12/2021 | Chen Kaidi | H04L 63/20 |
| 2023/0315835 | A1* | 10/2023 | Mo | G06F 21/46 726/6 |

OTHER PUBLICATIONS

Yoon, MyungKeun "Using Whitelisting to Mitigate DDoS Attacks on Critical Internet Sites" [Online], Jul. 2010 [Retrieved on: Jan. 23, 2024], IEEE Communications Magazine, Retrieved from: < https://ieeexplore.ieee.org/stamp/stamp.jsp?tp=&arnumber=5496886 > (Year: 2010).*

* cited by examiner

SYSTEMS AND METHODS FOR RAPID PASSWORD COMPROMISE EVALUATION

CROSS-REFERENCE TO RELATED APPLICATIONS

This application is a continuation-in-part of U.S. Non-Provisional application Ser. No. 17/472,788, filed Sep. 13, 2021, which is herein incorporated by reference.

FIELD OF TECHNOLOGY

The present disclosure relates to the field of data security, and, more specifically, to systems and methods for rapidly evaluating passwords and detecting password compromise.

BACKGROUND

In the realm of cybersecurity, one of the first lines of defense to a security breach is a user password. Unfortunately, users tend to use weak passwords for their web applications. These passwords are typically found in a list of commonly used passwords, which hackers can effortlessly plug-and-play using a brute-force attack. Once a password matches, the hackers gain access to the applications and user data, as well as gain the ability to install malware.

The majority of personal verification systems are based on password verification. Even with portable tokens, smart cards, and biostatistics as replacements, the password of remembrance readily remains the core component that is utilized for setting up a computer transaction personal identifier. Many additional safety mechanisms are particularly vulnerable to low-grade cryptosystems of the type that individuals may quickly recall. To reduce cyber threats, zero knowledge cipher protocols were devised to adapt to low grade cryptosystems. However, such protocols are slow and inefficient.

There are multiple approaches to prevent brute force attacks for web applications. These approaches are based on behavior patterns, rate limits, and Internet Protocol (IP) reputation. However, if a password is weak to begin with, the user's information will always remain in jeopardy. While some approaches may assess password strength, these practices are not consistent across all web applications. There is thus a need for completely blocking access to a web application if a password is weak, which mitigates the ability to determine the password by brute force. Specifically, this method should not should not require being built-in to the web application and should make it impossible for a hacker to circumvent protection by emulating a user's behavior, using distributed attacks to bypass rate limits, or using IP reputation.

Password strength is normally assessed when a user is setting up a new password or is updating his/her password (e.g., due to a periodic requirement). Suppose that a user sets a password when creating an account for a web application. Even if the password passes the initial requirements of the web application, hackers are constantly adding onto their brute-force attack password databases and a password that was previously acceptable may be compromised. Therefore, it is not enough to assess password strength at account creation or periodically.

SUMMARY

In some aspects, the techniques described herein relate to a method for rapid password evaluation, the method including: configuring a web application firewall (WAF) to monitor login credentials for one or more web applications; intercepting, using the WAF, a password input during a login attempt to a web application by an entity; calculating a hash value of the password input; transmitting the hash value to a dedicated server configured to: determine whether the hash value is in a database of hashes corresponding to weak passwords; and in response to determining that the hash value is in the database of hashes, transmit a message to the WAF indicating that the password input corresponds to a weak password; and generating for display, using the WAF, a web page prompting for a password reset for the web application.

In some aspects, the techniques described herein relate to a method, wherein the dedicated server is further configured to: receive and store, in a record database, an IP address of the entity and information about the login attempt; retrieve, from the record database, information about a first plurality of login attempts made by the entity in the web application for different user profiles; in response to determining that at least a first threshold number of login attempts have been performed by the entity, store the IP address in a blacklist.

In some aspects, the techniques described herein relate to a method, wherein the dedicated server is further configured to: receive and store, in a record database, an IP address of the entity and information about the login attempt; determine, based on entries in the record database, whether the IP address is associated with at least a threshold number of successful login attempts to the web application; in response to determining that the IP address is associated with at least the threshold number, store the IP address in a whitelist.

In some aspects, the techniques described herein relate to a method, wherein the dedicated server is further configured to: prior to determining whether the hash value is in the database of hashes, determining whether the IP address is in the whitelist; in response to determining that the IP address is in the whitelist, transmitting a message to the WAF to enable login without evaluating the password input.

In some aspects, the techniques described herein relate to a method, wherein the dedicated server is further configured to: determine whether the database of hashes has been updated with new password hash values since a last login attempt from the IP address in the whitelist; in response to determining that the database of hashes has been updated, compare the hash value to the new password hash values.

In some aspects, the techniques described herein relate to a method, wherein the dedicated server is further configured to: determine, based on a comparison, whether the hash value matches the new password hash values; in response to determining that the hash value matches the new password hash values, transmit a message to the WAF indicating that the password input corresponds to a weak password.

In some aspects, the techniques described herein relate to a method, wherein the dedicated server is further configured to: in response to determining that the hash value does not match the new password hash values, not perform a password evaluation until the database of hashes is updated.

In some aspects, the techniques described herein relate to a method, further including: detecting a subsequent login attempt at the web application or a different web application; in response to determining that the subsequent login attempt is through the IP address in the blacklist, preventing authorization to login successfully.

In some aspects, the techniques described herein relate to a method, wherein the first plurality of login attempts further includes a subset of login attempts made by the entity in at least one other web application.

In some aspects, the techniques described herein relate to a method, wherein the first plurality of login attempts further includes a subset of login attempts made by the entity using more than one password from the database of hashes for a single user profile.

In some aspects, the techniques described herein relate to a method, wherein the web page redirects to a password reset page of the web application.

In some aspects, the techniques described herein relate to a method, wherein the intercepting occurs prior to logging into the web application.

In some aspects, the techniques described herein relate to a method, wherein calculating the hash value of the password input further includes obfuscating the password input using a salt value that is concatenated with the password input prior to hashing.

In some aspects, the techniques described herein relate to a method, wherein the salt value has a lifetime after which a new salt value is generated for concatenation with a new password input.

In some aspects, the techniques described herein relate to a system for rapid password evaluation, the system including: a hardware processor configured to: configure a web application firewall (WAF) to monitor login credentials for one or more web applications; intercept, using the WAF, a password input during a login attempt to a web application by an entity; calculate a hash value of the password input; transmit the hash value to a dedicated server configured to: determine whether the hash value is in a database of hashes corresponding to weak passwords; and in response to determining that the hash value is in the database of hashes, transmit a message to the WAF indicating that the password input corresponds to a weak password; and generate for display, using the WAF, a web page prompting for a password reset for the web application.

In some aspects, the techniques described herein relate to a system, wherein the dedicated server is further configured to: receive and store, in a record database, an IP address of the entity and information about the login attempt; retrieve, from the record database, information about a first plurality of login attempts made by the entity in the web application for different user profiles; in response to determining that at least a first threshold number of login attempts have been performed by the entity, store the IP address in a blacklist.

In some aspects, the techniques described herein relate to a system, wherein the dedicated server is further configured to: receive and store, in a record database, an IP address of the entity and information about the login attempt; determine, based on entries in the record database, whether the IP address is associated with at least a threshold number of successful login attempts to the web application; in response to determining that the IP address is associated with at least the threshold number, store the IP address in a whitelist.

In some aspects, the techniques described herein relate to a system, wherein the dedicated server is further configured to: prior to determining whether the hash value is in the database of hashes, determining whether the IP address is in the whitelist; in response to determining that the IP address is in the whitelist, transmitting a message to the WAF to enable login without evaluating the password input.

In some aspects, the techniques described herein relate to a system, wherein the dedicated server is further configured to: determine whether the database of hashes has been updated with new password hash values since a last login attempt from the IP address in the whitelist; in response to determining that the database of hashes has been updated, compare the hash value to the new password hash values.

In some aspects, the techniques described herein relate to a non-transitory computer readable medium storing thereon computer executable instructions for rapid password evaluation, including instructions for: configuring a web application firewall (WAF) to monitor login credentials for one or more web applications; intercepting, using the WAF, a password input during a login attempt to a web application by an entity; calculating a hash value of the password input; transmitting the hash value to a dedicated server configured to: determine whether the hash value is in a database of hashes corresponding to weak passwords; and in response to determining that the hash value is in the database of hashes, transmit a message to the WAF indicating that the password input corresponds to a weak password; and generating for display, using the WAF, a web page prompting for a password reset for the web application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
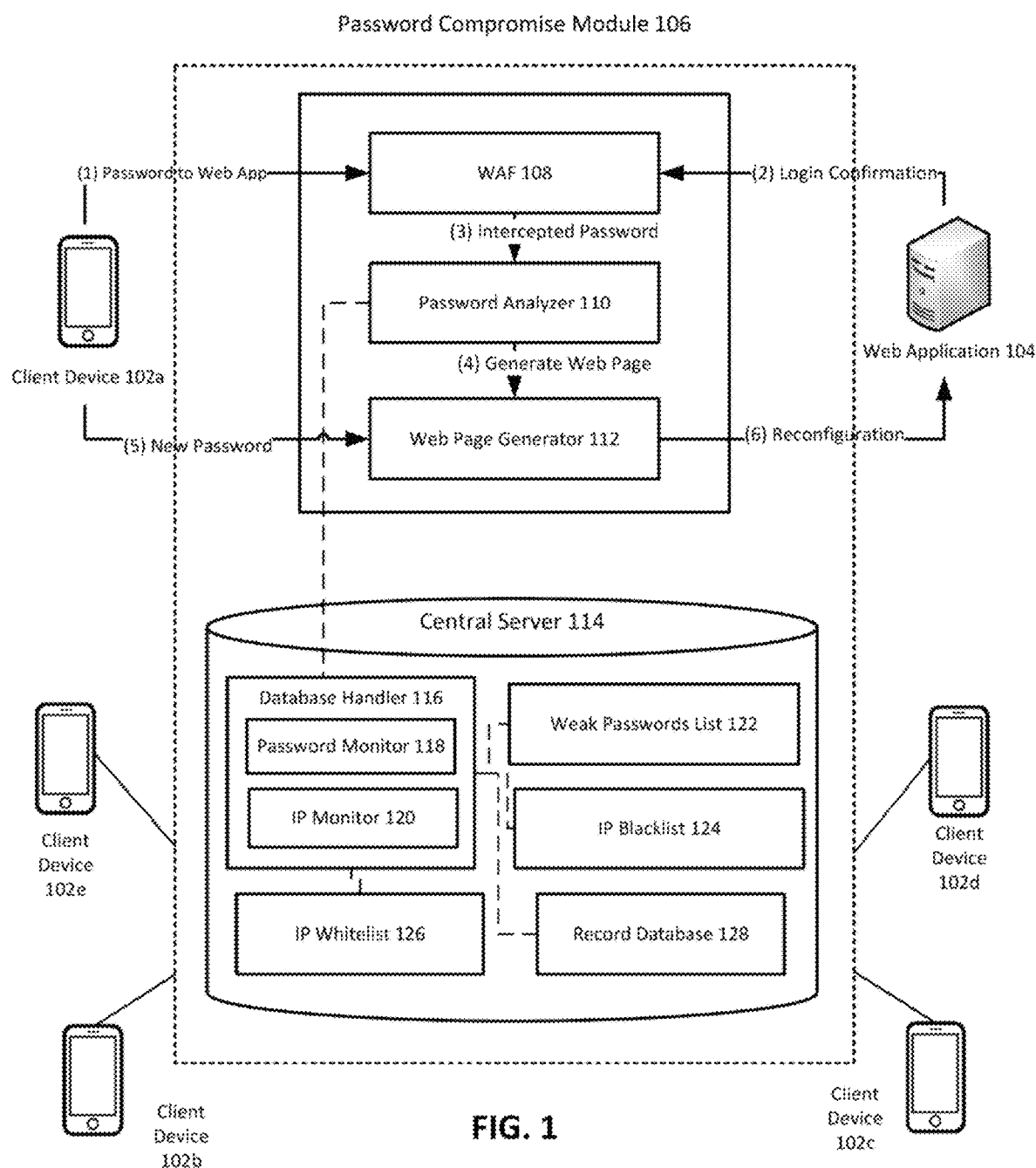
FIG. 1 is a block diagram illustrating a system for detecting malicious entities using weak passwords for unauthorized access.

Exemplary aspects are described herein in the context of a system, method, and computer program product for rapidly evaluating passwords and detecting password compromise. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The list of terms used in disclosure:
RBL—real-time block list
PW_DB—weak password database
IP_DB—Database for managing non-blacklisted IP addresses.
BL_IP_DB—database of blacklisted IP addresses
WAF—Web Application Firewall An objective of the present disclosure is providing independent fast systems and methods for detecting malicious objects that use weak passwords for unauthorized access, providing verification of the password hash outside the client server, and remotely managing weak passwords based on any network attached database.

A web application firewall (WAF) is a type of application firewall that applies specifically to web applications. Typically, WAF monitors and filters Hypertext Transfer Protocol (HTTP) traffic between a web application and a client device. Unlike a regular firewall, which serves as a security gate between servers, a WAF can filter the content of specific web applications. A web application or web app is a client-server computer program that a client runs in a web browser. A web app is stored on a remote server and delivered over the Internet through a browser interface. The web browser is effectively a part of the application architecture. However, certain web applications may provide different types of access-one being the web application in the browser, and another being a web service providing an Application Programming Interface (API) to interact with applications or between applications. The WAF described in the present disclosure may handle any type of access.

By inspecting HTTP traffic, a WAF can prevent attacks such as Structured Query Language (SQL) injections, cross-site scripting (XSS), file inclusion, and security misconfigurations, originating from a web application. A WAF identifies these attacks using parsing, signature detection, and specially configured rule-sets (also known as policies).

The functionality of a WAF can be implemented in software or hardware. For example, a WAF may be a virtual or physical appliance (e.g., a stand-alone device or network component) that prevents vulnerabilities in web applications from being exploited by outside threats.

In an exemplary aspect, the systems and methods disclosed herein involve blocking, using a WAF, a user (or a hacker) from logging into a web application with a weak password and forcing the user to reset the password.

FIG. 1 is a block diagram illustrating system 100 for rapidly evaluating passwords and detecting password compromise, according to an exemplary aspect. System 100 includes a plurality of client devices 102 (e.g., client devices 102a, 102b, 102c, 102d, and 102e), web application 104, password compromise module 106, and central server 114. Password compromise module 106 may include various components including WAF 108, password analyzer 110, and web page generator 112.

In system 100, password compromise module 106 may sit in front of web application 104 and is configured to intercept a password entered at a login screen of web application 104 using WAF 108, determine whether the password is weak, and generate a web page prompting a user to change the password in response to determining that the password is weak.

In one aspect, WAF 108 intercepts a first HTTP message to web application 104 from client device 102a—the first message comprising a login username and password for web application 104. For example, WAF 108 may generate and execute a WAF rule that intercepts a HTTP request to a login submission page and extracts the password parameter from the HTTP request. It should be noted that although most login submissions are done over HTTPS (SSL encrypted protocol), WAF resides after SSL is terminated, which is why a WAF captures everything in the request in an unencrypted format. In some optional aspects, WAF 108 may subsequently intercept a second HTTP message to client device 102a from web application 104. The second message may comprise an indication that the provided login username and password are valid login credentials to access web application 104. For example, web application 104 may be a shopping application. A user may enter his/her username and password into client device 102a and web application 104 may provide an indication to client device 102a that the login information is correct, allowing the user to access his/her shopping profile and orders. If the login confirmation is not received by web application 104, it is possible that the individual attempting to access web application 104 is not an authorized user. Because of this, a password reset is not prompted. The interception of the second message may be optional depending on whether the WAF 108 is pre-configured to intercept validation messages.

In response to intercepting at least the first message, password analyzer 110 requests database handler 116 to check whether the intercepted password is found in central server 114 comprising known weak passwords. These weak passwords may be stored in weak passwords list 122. Known weak passwords may be predetermined terms that have a high probability of being compromised. Suppose that the password of the user is "hello123." Database handler 116 may find "hello123" in weak passwords list 122. Password analyzer 110 may then generate a binary output (e.g., "1" for yes, and "0" for no). If the output is positive (i.e., the password is in weak passwords list 122), web page generator 112 may generate a web page prompting the user to change the password.

In addition, database handler 116 may store, in central server 114, an IP address of the entity and information about the login attempt. The information about the login attempt may include a timestamp indicating when the login was attempted, at least one identifier of web application 104 (e.g., name, developer name, version, etc.), an identifier of the device on which the login was attempted (e.g., name of device, version, hardware specifications, etc.), the login credential, and information about the network (e.g., name, type, version, etc.). For example, an entry stored in central server 114 may be:

| IP Address | Time | Day | Web Application | Username | Password | ... | Device |
| --- | --- | --- | --- | --- | --- | --- | --- |
| 192.158.1.38 | 19:12:12 | Jan, 1, 2021 | Amazon | zzz@zzz.com | hello123 | ... | ... |

Password compromise module 106 may be software that is installed on a client device 102. In some aspects, password compromise module 106 is split into a thin client application and a thick client application. For example, the thin client application may be installed on client device 102a and the thick client application may be installed on a remote server (not shown) configured to communicate with the thin client application (e.g., via the Internet). In this example, password analyzer 110, web page generator 112, and central server 114 may be part of the thick client application. For example, WAF 108 may intercept a password provided by client device 102a and transmit the password to password analyzer 110 of password compromise module 106 on a remote server.

In an exemplary aspect, database handler 116 may retrieve information about a first plurality of login attempts made by the entity in web application 104 for different user profiles. For example, the entity may use client device 102a to access multiple different accounts on web application 104. For each access attempt where the password is weak, database handler 116 generates a new access entry. Periodically, IP monitor 120 may determine the number of attempts an entity has made in a web application. For example, IP monitor 120 may retrieve the following entries comprising the IP address of the entity and the web application:

| IP Address | Time | Day | Web Application | Username | Password | ... | Device |
|---|---|---|---|---|---|---|---|
| 192.158.1.38 | 19:12:12 | Jan, 1, 2021 | Amazon | zzz@zzz.com | hello123 | ... | 102a |
| 192.158.1.38 | 19:12:15 | Jan, 1, 2021 | Amazon | aaa@zzz.com | hello123 | ... | 102a |
| 192.158.1.38 | 19:12:18 | Jan, 1, 2021 | Amazon | bbb@zzz.com | hello123 | ... | 102a |
| ... | ... | ... | ... | ... | ... | ... | ... |
| 192.158.1.38 | 19:12:21 | Jan, 1, 2021 | Amazon | ccc@zzz.com | hello123 | ... | 102a |

In response to determining that at least a first threshold number of login attempts have been performed by the entity, IP monitor 120 may store the IP address in a blacklist (e.g., IP blacklist 124). For example, if the first threshold number is 10 (set by IP monitor 120) and there are 11 retrieved entries featuring the IP address and the web application, the entity associated with the IP address may be identified by password compromise module 106 as a malicious entity. Thus, if WAF 108 detects a subsequent login attempt at the web application or a different web application, in response to determining that the subsequent login attempt is through the IP address in the blacklist, WAF 108 may prevent giving authorization to login successfully (regardless if the password is weak or not).

In some aspects, IP monitor 120 may only retrieve entries within a certain time period (e.g., all entries within the hour). In some aspects, IP monitor 120 may further retrieve login attempts into other web applications. Thus, the first plurality of login attempts may include a subset of login attempts made by the entity in at least one other web application as shown below:

| IP Address | Time | Day | Web Application | Username | Password | ... | Device |
|---|---|---|---|---|---|---|---|
| 192.158.1.38 | 19:12:12 | Jan, 1, 2021 | Amazon | zzz@zzz.com | hello123 | ... | 102a |
| 192.158.1.38 | 19:12:15 | Jan, 1, 2021 | Amazon | aaa@zzz.com | hello123 | ... | 102a |
| 192.158.1.38 | 19:12:18 | Jan, 1, 2021 | Amazon | bbb@zzz.com | hello123 | ... | 102a |
| ... | ... | ... | ... | ... | ... | ... | ... |
| 192.158.1.38 | 19:20:01 | Jan, 1, 2021 | Gmail | zzz@zzz.com | hello123 | ... | 102a |
| 192.158.1.38 | 19:23:11 | Jan, 1, 2021 | Facebook | zzz@zzz.com | hello123 | ... | 102a |

Because the login attempts to a Gmail account and Facebook account are included, there are more entries to compare against the first threshold number. This increases the likelihood of an entity being identified as a malicious entity. In some aspects, because there are more entries, the threshold number may be increased to adjust the sensitivity of password compromise module 106 and prevent false negatives/positives.

In some aspects, IP monitor 120 may retrieve entries that share an IP address, a web application, and a user login credential. Thus, the first plurality of login attempts may include a subset of login attempts made by the entity using more than one password from the database of weak passwords for a single user profile as shown below:

| IP Address | Time | Day | Web Application | Username | Password | ... | Device |
|---|---|---|---|---|---|---|---|
| 192.158.1.38 | 19:12:12 | Jan, 1, 2021 | Amazon | zzz@zzz.com | hello | ... | 102a |
| 192.158.1.38 | 19:12:15 | Jan, 1, 2021 | Amazon | zzz@zzz.com | hello1 | ... | 102a |
| 192.158.1.38 | 19:12:18 | Jan, 1, 2021 | Amazon | zzz@zzz.com | hello12 | ... | 102a |
| ... | ... | ... | ... | ... | ... | ... | ... |
| 192.158.1.38 | 19:12:21 | Jan, 1, 2021 | Amazon | zzz@zzz.com | hello123 | ... | 102a |

IP monitor 120 may then identify each unique password in the retrieved entries and compare them against weak passwords list 122. Suppose that all of the passwords are present in weak passwords list 122. IP monitor 120 may count a number of instances in which a unique password entered in the web application was found in the retrieve entries. IP monitor 120 may then compare that value to a threshold number. For example, if 10 entries were identified and 5 is the threshold number, because there number of instances exceeds the threshold number, IP monitor 120 may store the IP address in IP blacklist 124 and identify the entity as malicious.

In some aspects, whenever an entity with an IP address in IP blacklist 124 attempts to log in to a web application, password compromise module 106 may retrieve the password entered by the IP address as a login credential. Password monitor 118 may then determine whether the retrieved password is in the database of weak passwords (e.g., weak passwords list 122). If the password is not in the database, password monitor 118 may add the password to weak passwords list 122 (on the merit that a malicious entity has attempted to use the password).

In some aspects, multiple client devices have password compromise module 106 installed. In some aspects, each of the client devices (e.g., 102a, 102b, 102c, 102d, and 102e) may periodically synchronize their central server 114 with one another. In other aspects, password compromise module 106 may also be installed on a remote server and each password compromise module 106 may synchronize central server 114 with the remote server.

In some aspects, WAF 108 intercepts a password from client device 102a and a confirmation from web application 104 that the password is correct. Password analyzer 110 may then determine, via database handler 116, that the password is not in the database of weak passwords. In response, password monitor 118 stores the password, the IP address of the entity, and further information about the login attempt in central server 114. Password monitor 118 further retrieves information about a second plurality of login attempts in which the password was used for successful login into the web application by different user profiles. For example, password monitor 118 may retrieve the following entries:

| IP Address | Time | Day | Web Application | Username | Password | ... | Device |
|---|---|---|---|---|---|---|---|
| 192.158.1.34 | 19:12:12 | 01-06-21 | Amazon | erw@zyz.com | Treats931 | ... | 102a |
| 192.134.1.38 | 11:12:15 | 02-01-21 | Amazon | dfd@zfz.com | Treats931 | ... | 102b |
| 192.118.1.38 | 1:12:18 | 01-02-21 | Amazon | zfd@zfz.com | Treats931 | ... | 102c |
| ... | ... | ... | ... | ... | ... | ... | ... |
| 192.158.20.3 | 15:12:21 | 03-16-21 | Amazon | zzn@zzz.com | Treats931 | ... | 102e |

As can be seen, different devices with different IP addresses across a period of time have used the password "Treats931." Password monitor 118 may determine the number of entries in which the password shows up (in some cases across different web applications to adjust sensitivity) for a unique username. In response to determining that at least a second threshold number of login attempts have been performed using the password, password monitor 118 may include the password in the database of weak passwords (e.g., weak passwords list 122).

In some optional aspects, database handler 116 may determine that the intercepted password does not match any of the passwords in the database of weak passwords (e.g., weak passwords list 122). In this situation, password analyzer 110 may extract attributes associated with the intercepted password (e.g., use of numbers, upper-case lower-case letters, characters, etc.) and determine a strength level accordingly. For example, the use of multiple numbers, variations of capitalization, and randomness of characters may be interpreted by the password analyzer 110 as a password with a better strength level than a password that features a lot of repetition, no capitalization variations, or randomness in characters. Based on these features, password analyzer 110 assigns a numerical value (i.e., the strength level). Each attribute may be associated with a certain numerical value that contributes to the strength level. For example, the variation of capitalization may be worth a strength value of 0.1 and the use of numbers may be worth a strength value of 0.3. Password analyzer 110 sums these values to get the strength level. Password analyzer 110 may then compare the determined strength level with the threshold strength level. In response to determining that the strength level is less than the threshold strength level, password analyzer 110 may command web page generator 112 to generate a web page that prompts a password reset. WAF 108 may then redirect the user to a "reset your password" web page. The web page may display a message such as: "Your password was compromised, please reset it."

In one aspect, subsequent to intercepting a weak password, instead of redirecting to a password reset page, password compromise module 106 may trigger a script on a server that automatically resets the password, and sends the new password to the user (e.g., via email). In some conventional approaches, the password reset occurs in response to the user requesting that the password be changed (e.g., pressing "forgot my password"). The script may, for example, generate a string comprising a set of random characters and verify that the string does not match a password in the database of weak password. However, in the present disclosure, the change is automatic and is in response to the password being determined to be prone to a brute force attack (e.g., the password is in a database of weak passwords). Thus the user does not decide whether to change the password manually.

In one aspect, upon successful login, password compromise module 106, using WAF, may generate a new web page and ask for a verification code sent to the user (e.g., via email), thus providing a form of two factor authentication.

Figure 2:
FIG. 2 is a diagram illustrating a password compromise alert.

FIG. 2 is diagram 200 illustrating a password compromise alert. Diagram 200 depicts a web page generated by web page generator 112 and redirected to by WAF 108. The web page includes a password compromise alert that indicates to the user that the password used by the user is in a "hacker's dictionary" (e.g., a weak password list). The web page further indicates that the request to login has been blocked to prevent unauthorized access to an administrative panel (e.g., user settings). Lastly, the web page provides a link to reset the password.

In one aspect, web page generator 112 may use a single page residing at a single Uniform Resource Locator (URL). For example, a URL to a reset page for the web application may be added by the WAF when redirecting. In another aspect, web page generator 112 may use a different web page for each web application, domain, or server. For example, if the base URL of the generated reset page is secure.com/reset.html and web application 104 is installed at domain.com/wp/, with reset password page for web application 104 being at domain.com/wp/reset_password.php, web page generator 112 may generate the URL secure.resetpage.com/reset.html?rp=https://domain.com/wp. The web page may display a message "your password for website domain.com/wp/is compromised, please reset your password by following reset link:

secure.resetpage.com/reset.html?rp=https://domain.com/wp".

In some aspects, web page generator 112 may include the login username as a parameter. For example, the login username may be "USERNAME." Accordingly, the URL may be secure.resetpage.com/reset.html?rp-https://domain.com/wp&login=USERNAME. The login username can be used as part of the message, as well as part of the reset link provided to user. The inclusion of the username is to make the user more at ease when accessing the web page. Because the web page is not integrated with the web application itself (e.g., is not built by the web application), the web page may appear fake to the user. Thus the username provides the user with familiarity.

In one aspect, subsequent to generating for display the web page on client device 102, the user may enter a new password. Password compromise module 106 may receive the new password and send it through password analyzer 110 to ensure that the new password is not in the database of weak passwords. If the new password is not in the database of weak passwords, password compromise module 106 may reconfigure web application 104 to accept the new password instead of the old password as the valid login credential. If the new password is in the database of weak passwords, password compromise module 106 may prompt the user to provide a newer password (i.e., intercept the new password using WAF 108).

Thus far, the focus on evaluating passwords has been results-oriented. If the weak password is detected, one objective of the present disclosure has been met. However, the speed at which the weak password is detected is another aspect that affects quality of service. Many regular users use simple passwords. This makes it easy to hack into these profiles, access data, and install malware. The average dictionary of weak passwords has a size of about 5 million items. Not all servers are able to work properly when processing large amounts of data frequently such as this. The approach becomes processor-heavy and slow, which is counterintuitive when a user is attempting to quickly access his/her web application profile. To eliminate high loads on client servers, the present disclosure describes moving the calculations to an external server. The use of an external server allows for receiving and processing data in real-time.

The main procedures/components that need to be followed are: (1) the management of contents in a password list, (2) management of the size of the password list, (3) reducing the consumption of random access memory (RAM)

on client servers, (4) reduced disk space consumption on client servers, and (5) reducing the load on password verification on client servers.

In an exemplary aspect, when a login is attempted, the hash (e.g., sha1) of the password is calculated, and sent to central server 114. Hashing the password keeps the password private and secure, without compromising the login credentials. Thus, if a password is strong and is not present is the weak passwords list 122, it is not revealed to central server 114 or any other entity. Weak passwords list 122 may include a hash value for each respective entry. If the calculated password hash is present in weak passwords list 122, login/registration is consequently terminated and the client is prompted to strengthen the password. In some aspects, queries are sent to central server 114 unencrypted.

Referring back to FIG. 1, system 100 showcases the working process of an independent weak password prevention system—from the first login attempt made from a personal device (e.g., client device 102*a*) through detecting if a provided password is strong enough or if the password is potentially weak, or from determining whether an IP address of the client device 102*a* is listed in IP blacklist 124 to taking an action based on above mentioned criteria. For example, if a password is strong and the IP address is not in IP blacklist 124, then the login process is continued. If the password is weak, then the client device 102*a* is redirected to a password update page. If an IP address is in IP blacklist 124, then client device 102*a* is automatically blocked. WAF 108 and central server 114 are linked through requests and responses of password monitor 118, IP monitor 120, password analyzer 110, an IP anti-spoofer, etc. In some aspects, IP blacklist 124 and IP whitelist 126 are specific to web application 104. For a different web application, there may be a different blacklist and whitelist.

In some aspects, central server 114 uses a binary decision tree to determine whether to block a login attempt and/or recommend a password change. For example, when receiving data, if the IP address of a client device is in IP blacklist 124, the action "store IP login attempt details to IP Blacklist Database" will be made and consequently reported to WAF 108 of denial. Otherwise if the IP address is not in IP blacklist 124, central server 114 will check if the password is weak or not. Further if password is not weak, central server 114 may execute the action "store IP login attempt data to IP Whitelist Database." If the number of login attempts is not greater than a set threshold number, then central server 114 may report permission to WAF 108.

In other cases, if the number of login attempts is greater than a set threshold number, then the IP address will be stored in IP blacklist 124 and denial is reported to WAF 108. In case if the password is weak, central server 114 takes the action "Store IP login attempt data to IP Whitelist Database" and the information about the previous set of login attempts made by an entity in a web application for different users is accessed. Further based on the number of login attempts (greater or not), central server 114 reports to WAF 108 of denial (i.e., store the IP address in a blacklist) or redirection. Another criteria is taking into account whether the number of password value attempts and login value attempts are greater than a set threshold number. For example, based on the number of password value attempts, central server 114 determines whether to include the password in weak passwords list 122 or monitor usage of password, and based on the number of login value attempts, determine whether to include the login in the database of popular logins or monitor usage of the login.

In an exemplary aspect, system 100 configures WAF 108 to monitor login credentials for one or more web applications, and further intercept a password input during a login attempt to a web application by an entity by using WAF 108 to send intercepted data and a potential attacker's IP address to central server 114. When a response is received from central server 114, if the password is in a blacklist, WAF 108 denies access to a web application. If not, central server 114 checks if the password is in a database of weak passwords. Based on whether the password is in the database of weak passwords, central server 114 recommends to WAF 108 continuing login or redirecting to a compromising alert web page (and then redirecting to a password update page).

The speed at which a password is to be checked can affect the quality of password compromise module 106. Because several thousands of users may be evaluating passwords at once, any slowdown in password evaluation is perceived as poor performance. To improve the speed at which passwords are evaluated, a combination of actions can be taken. The first involves offloading processing to central server 114 instead of performing the search locally on the client server where WAF 108 is installed. Central server 114 is shown as a single server in FIG. 1, but may be a plurality of servers that are dedicated to password evaluation. In addition, there may be a reliance on determining whether an IP address exists in IP whitelist 126 or IP blacklist 124 before even determining whether a password is being compromised. If the accessing IP address is in IP blacklist 124, regardless of whether the password is weak or not, the login attempt can be blocked.

It should also be noted that login attempts cannot be considered in a vacuum. Consider an example of a user logging into an email account. During a period of time, such as a year, the user may log into the email account with a set of login credentials (e.g., a username and a password) a first amount of times. For example, the user may make 100 attempts and 99 attempts may be successful (with one being an accidental typo that was rectified in a subsequent attempt). Evaluating the password at each attempt may be unnecessary if the user is trusted. For simplicity, suppose that the user logs in at home and at the workplace. There may be two IP addresses that are associated with the set of 99 logins. Password compromise module 106 may be configured to store records in record database 128 about each login attempt. A sample record may be:

Date: Oct. 12, 2011
Time: 13:05:11
IP Address: 192.134.1.38
User: zzn@zzz.com
Pass: eadfl29s
Result: Success If the login attempts from a particular IP address are successful a threshold amount of times (e.g., 5 times) and the password is not found to be weak in any of those attempts, password compromise module 106 may enter the IP address into IP whitelist 126. During subsequent attempts to log into the email account, password compromise module 106 may determine whether the IP address is part of IP whitelist 126. If the IP address is part of IP whitelist 126, the input password is not evaluated for being weak. Password compromise module 106 may, however, perform an evaluation if the user changes the password since the time of the previous login attempt.

Because the weak password list changes over time to account for new weak passwords, in some aspects, password compromise module 106 may evaluate whether a password is weak (even if an IP address is in IP whitelist 126) if the weak password list has updated (e.g., new entries of weak passwords are added). In particular, password compromise module 106 may compare the input password against only the new entries in the weak password list since the last login attempt.

The threshold number of times that the login attempts have to be successful by a particular IP address is important to differentiate an authorized user from an unauthorized user. For example, after five successful login attempts with a particular password from an authorized user, it can be assumed that the email account is being accessed by a regular user. If that threshold number is not yet reached, it may be difficult to truly classify an attempt as authentic or not. For example, an unauthorized user may only be able to get one successful login attempt after several unsuccessful attempts. An unauthorized user is not expected to reach the threshold number of successful login attempts, which means the password evaluation will be triggered at each attempt. This is because an unauthorized user may simply steal the data he/she is looking for in one login session.

One indication of an unauthorized login attempt is consecutive login failures within a threshold period of time. For example, if a user forgets his/her password and performs a guess and check approach to logging in, the user may experience a few failed login attempts. If the IP address is in IP whitelist 126, password compromise module 106 may determine that although there are consecutive login attempts that have failed (e.g., 5 failed attempts within 1 minute), because the IP address is in IP whitelist 126, the login attempts may not be unauthorized. In other words, a user may simply have forgotten his/her password. Accordingly, password compromise module 106 may recommend a password reset.

However, suppose that an unauthorized entity attempts to access a web application. For example, the entity attempts a brute force approach to gain access to the web application using weak passwords. Password compromise module 106 may detect consecutive failed attempts that have reached a failure threshold within a period of time. In response to determining that the IP address is not in the whitelist, password compromise module 106 may determine whether record database 128 has additional indications of failed consecutive attempts in the past. For example, password compromise module 106 may preliminarily determine that an IP address of a user belongs in IP blacklist 124 because of a threshold number of consecutive failed login attempts within a period of time. Password compromise module 106 may then determine whether record database 128 includes other instances of consecutive failed login attempts (e.g., where the threshold number has been reached) for different web applications by the same IP address. In response to identifying at least one other instance, password compromise module 106 may add the IP address to IP blacklist 124.

Evaluating past password attempts through an IP address is useful because password compromise module 106 may adjust threshold settings to further differentiate authorized users and unauthorized users. As discussed previously, once an IP address hits a certain number of successful login attempts to a particular web application, the IP address is added to IP whitelist 126. The number of successful login attempts is set such that the number will likely not be reached by an unauthorized user. When considering an IP address that is to be entered in IP blacklist 124, password compromise module 106 may determine using record database 128, the maximum number of successful login attempts the corresponding user had for any particular web application. Password compromise module 106 may then update the threshold number of required successful login attempts to be greater than that maximum number.

Figure 3:
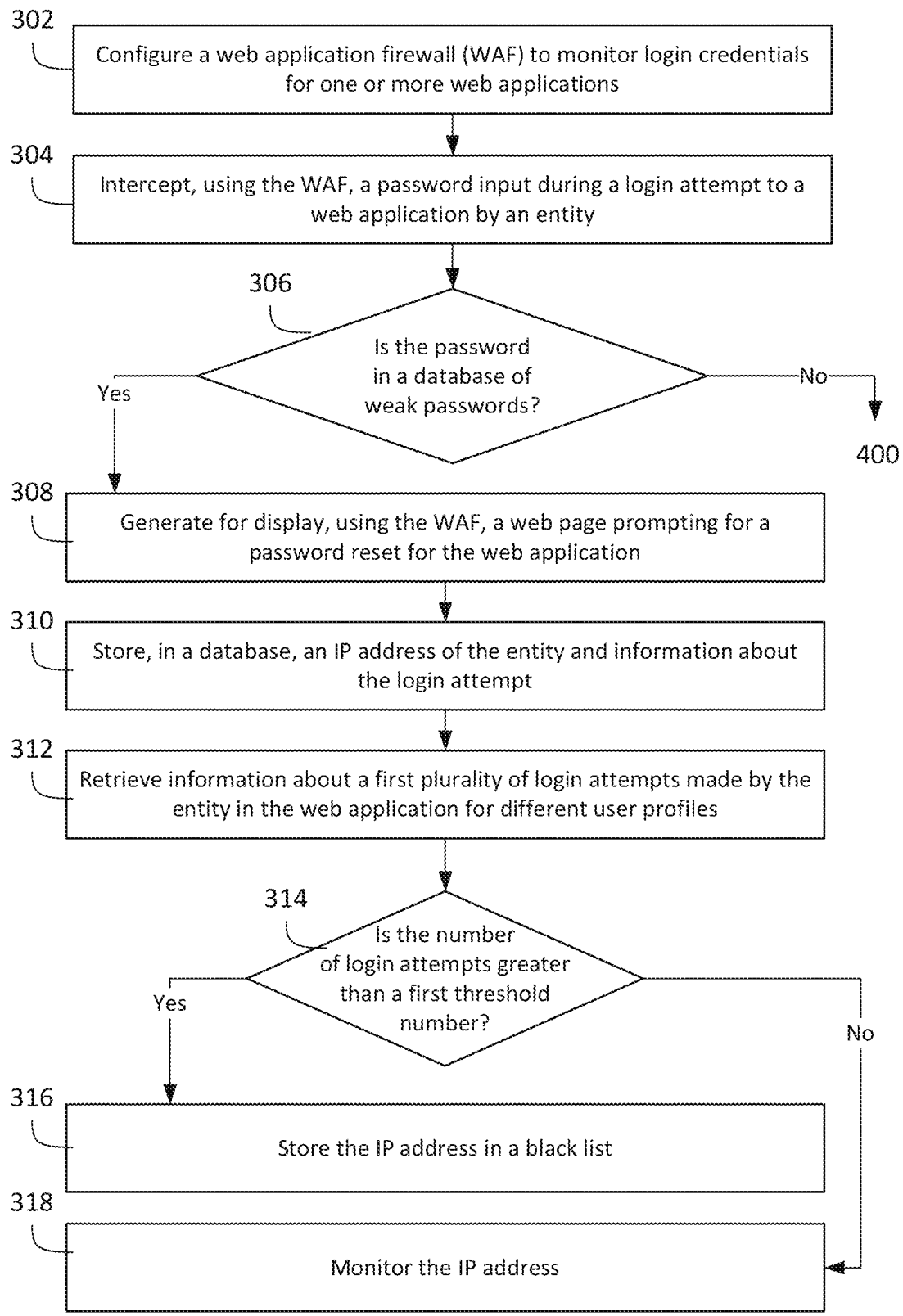
FIG. 3 is a flow diagram illustrating a method for detecting malicious entities using weak passwords for unauthorized access.

FIG. 3 is a flow diagram illustrating method 300 for detecting malicious entities using weak passwords for unauthorized access. At 302, password compromise module 106 configures WAF 108 to monitor login credentials for one or more web applications. At 304, WAF 108 intercepts a password input during a login attempt to a web application by an entity. At 306, password analyzer 110 determines whether the password is in a database of weak passwords (e.g., weak passwords list 122 in central server 114). In response to determining that the password is in the database of weak passwords, method 300 advances to 308, where web page generator 112 generates a web page prompting for a password reset for the web application and WAF 108 redirects from the login page to the generated web page. If the password is not in the database of weak passwords, method 300 advances to method 400 (described below).

At 310, password compromise module 106 stores, in a database (e.g., central server 114), an IP address of the entity and information about the login attempt. At 312, database handler 116 retrieves information about a first plurality of login attempts made by the entity in the web application for different user profiles. At 314, database handler 116 determines whether the number of login attempts is greater than a first threshold number. If the number is greater than the first threshold number, at 316, database handler 116 stores the IP address in IP blacklist 124. If the number is not greater than the first threshold number, at 318, IP monitor 120 of database handler 116 continues to monitor the IP address.

Figure 4:
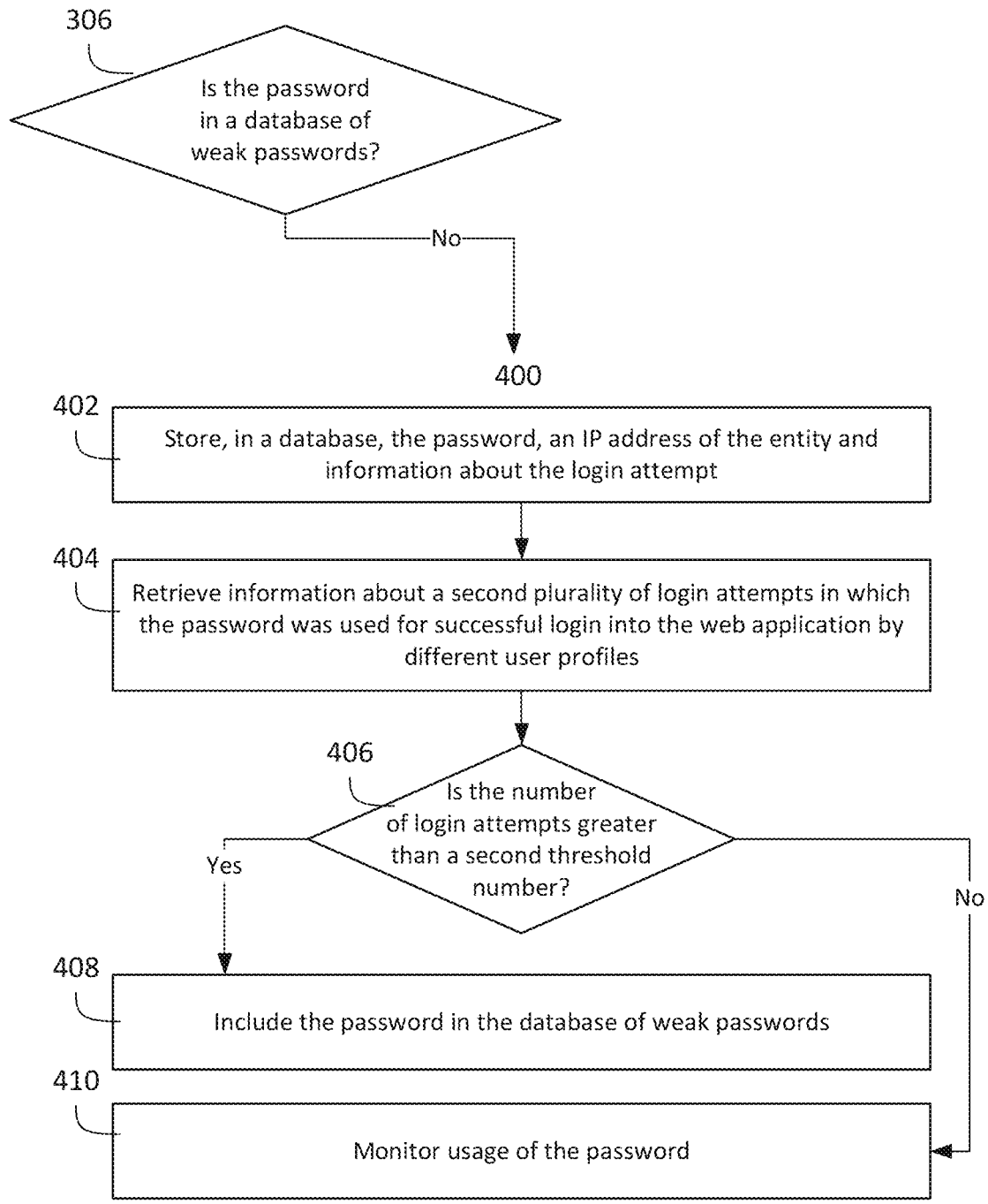
FIG. 4 is a flow diagram illustrating a method for updating a database of weak passwords.

FIG. 4 is a flow diagram illustrating method 400 for updating a database of weak passwords. As noted before, method 400 may be executed by system 100 in response to password analyzer 110 determining that the password is not in the database of weak passwords. At 402, password compromise module 106 stores, in central server 114, the password, an IP address of the entity, and information about the login attempt. At 404, database handler 116 retrieves information about a second plurality of login attempts in which the password was used for successful login into the web application by different user profiles.

At 406, database handler 116 determines whether the number of login attempts is greater than a second threshold number. If the number is greater than the second threshold number, at 408, database handler 116 includes the password in the database of weak passwords (e.g., weak passwords list 122 in central server 114). If the number is not greater than the second threshold number, at 410, password monitor 118 of database handler 116 continues to monitor the password.

Figure 5:
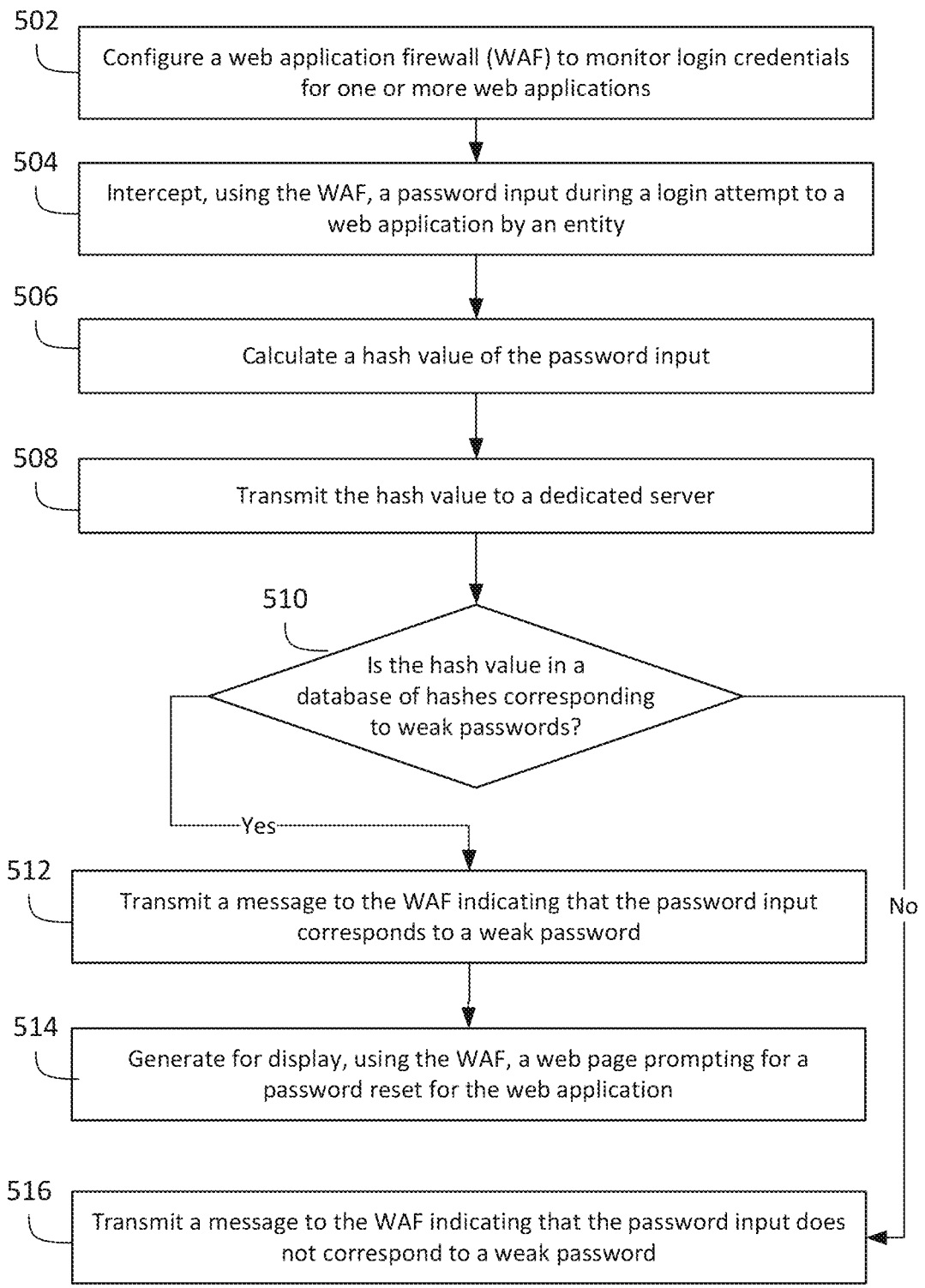
FIG. 5 is a flow diagram illustrating a method for rapidly evaluating passwords and detecting password compromise.

FIG. 5 is a flow diagram illustrating method 500 for rapidly evaluating passwords and detecting password compromise. At 502, password compromise module 106 of a local client server configures a web application firewall (WAF) to monitor login credentials for one or more web applications. At 504, WAF 108 intercepts a password input during a login attempt to a web application by an entity. At 506, password compromise module 106 of the local client server calculates a hash value of the password input. At 508, password compromise module 106 of the local client server transmits the hash value to a dedicated server. At 510, password compromise module 106 of the dedicated server determines whether the hash value is in a database of hashes corresponding to weak passwords. In response to determining that the hash value is in the database of hashes, at 512, password compromise module 106 of the dedicated server transmits a message to WAF 108 indicating that the password input corresponds to a weak password. At 514, password compromise module 106 generates for display, using the WAF, a web page prompting for a password reset for the web application. In response to determining that the hash value is not in the database of hashes, at 516, password compromise module 106 of the dedicated server transmits a message to WAF 108 indicating that the password input does not correspond to a weak password.

In some aspects, password compromise module 106 of the dedicated server is further configured to receive and store, in record database 128, an IP address of the entity and information about the login attempt. This is a record described previously. Password compromise module 106 of the dedicated server retrieves, from record database 128, information about a first plurality of login attempts made by the entity in the web application for different user profiles. In response to determining that at least a first threshold number of login attempts have been performed by the entity, password compromise module 106 stores the IP address in IP blacklist 124.

In some aspects, password compromise module 106 of the dedicated server determines, based on entries in record database 128, whether the IP address is associated with at least a threshold number of successful login attempts to the web application. In response to determining that the IP address is associated with at least the threshold number, password compromise module 106 stores the IP address in IP whitelist 126.

Thus, prior to determining whether the hash value is in the database of hashes, password compromise module 106 of the dedicated server may save time and processing by determining whether the IP address is in IP whitelist 126. In response to determining that the IP address is in IP whitelist 126, password compromise module 106 transmits a message to the WAF to enable login without evaluating the password input.

In some aspects, password compromise module 106 of the dedicated server may determine whether the database of hashes has been updated with new password hash values since a last login attempt from the IP address in IP whitelist 126. In response to determining that the database of hashes has been updated, password compromise module 106 may compare the hash value to the new password hash values.

Password compromise module 106 may further determine, based on a comparison, whether the hash value matches the new password hash values. In response to determining that the hash value matches the new password hash values, password compromise module 106 transmits a message to the WAF indicating that the password input corresponds to a weak password. On the other hand, in response to determining that the hash value does not match the new password hash values, password compromise module 106 does not perform a password evaluation until the database of hashes is updated.

The present disclosure ultimately describes the following steps: (1) setting up a WAF for monitoring authorization data and remote IP; intercepting authorization data with the help of WAF; sending remote IP and encrypted data or a hash of data to servers with a password database; checking the password in the database on the side of the correlating server; sending a message to the WAF of whether the password is weak; if a password is weak, forcing password resetting; saving remote IP and number of incidents with the IP address in a record database; checking in the database for the presence/number of hits from the remote IP; when a certain threshold is reached, adding the IP in a blacklist.

When recording each request and considering an IP address, the present disclosure describes consequently analyzing such records for brute force attacks; controlling when database BLIP_DB is stored on server with weak passwords; configuring the WAF to send an attacker's IP with authentication data; checking the attacker's IP address for blacklisted content; if the IP address trying to log in and a password is in blacklist, denying login; saving IP data to IP_DB; adding IP to BL_IP_DB when threshold is reached, which allows a real-time manipulation of BL_IP_DB content.

In some aspects, the present disclosure describes collecting information about popular passwords on PW_DB; keeping a record of the authorization data that was requested for processing; if password data missing from PW_DB was requested many times from different IP addresses, but the password data is not in the popular password database, adding password data to PW_DB when a set threshold is reached; providing a response based on results of analysis on records made for brute force attacks.

In some aspects, the present disclosure describes when there is a need to make changes to the PW_DB database (e.g., automatically removing weak passwords from the database of hashes corresponding to weak passwords when a given weak password does not match even once over a threshold number of password evaluations), adding real-time password deletion data records; offloading the central processing unit (CPU) of the customer's server by offloading from mass checks of password data against a large list of passwords, which allows the method to be used on weak servers; and freeing the RAM of user servers from storing a large list of passwords, which allows the method to be used on weak servers.

Figure 6:
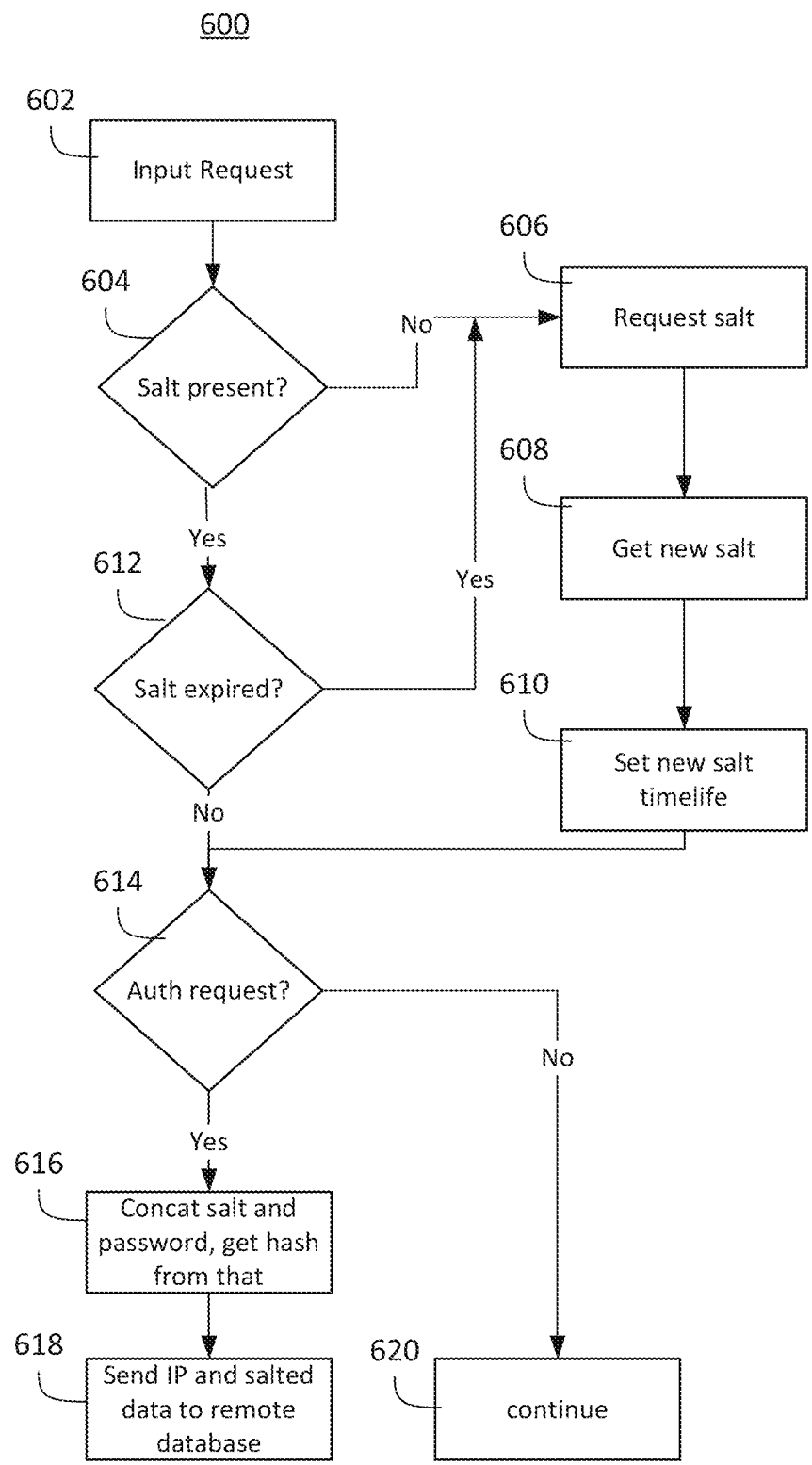
FIG. 6 is a flow diagram illustrating a method for obfuscating authentication data with a random lifetime limited string (salt) on the client-side.
Figure 7:
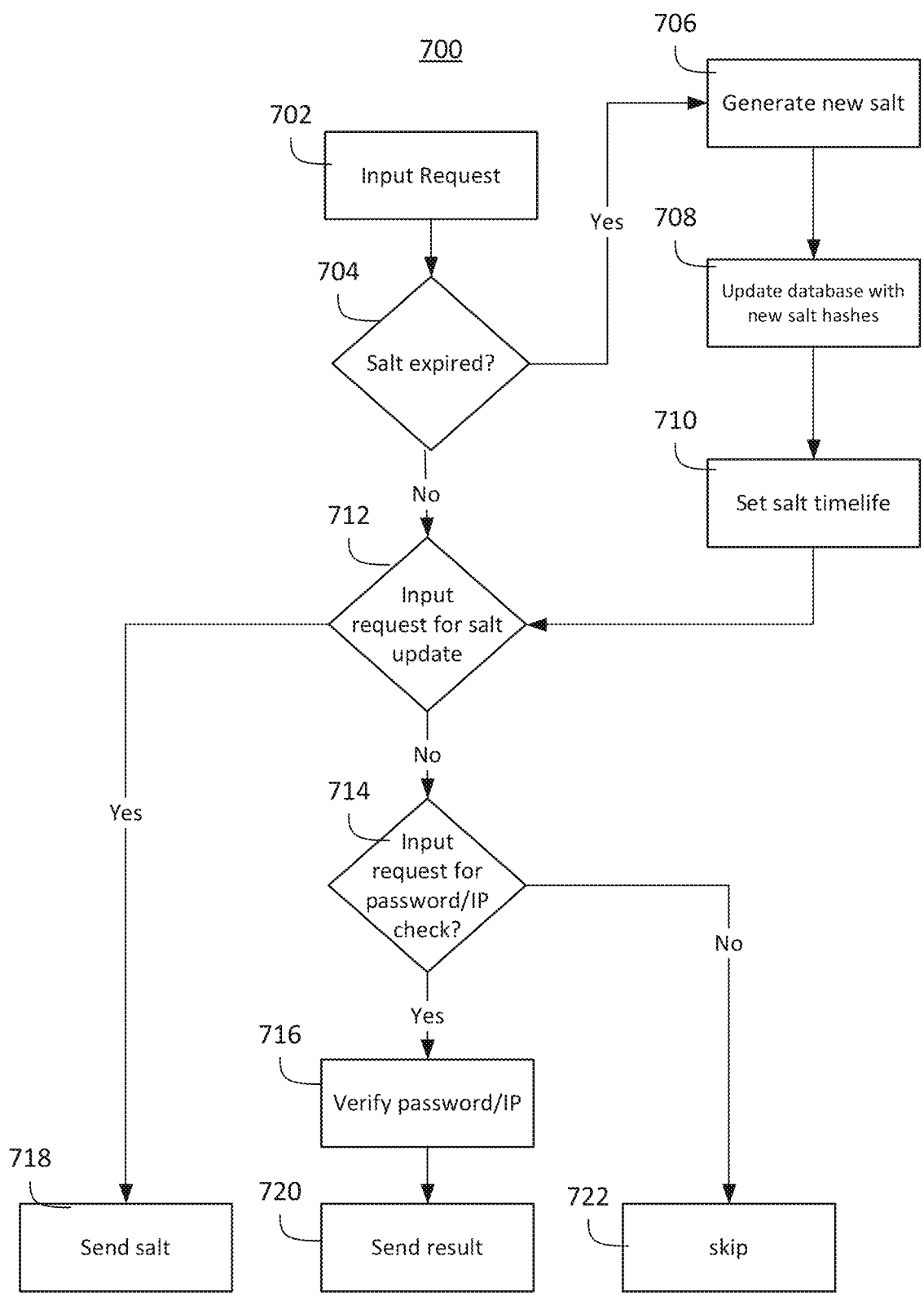
FIG. 7 is a flow diagram illustrating a method for obfuscating authentication data with a random lifetime limited string (salt) on the server-side.

FIGS. 6 and 7 describe an approach to ensuring the security of passwords and/or usernames that are transmitted from client device 102a to central server 114. In some aspects, any combination of a user name and a password is considered "authentication data." In particular, such data is obfuscated to prevent malicious entities from intercepting communications between client device 102a and central server 114.

FIG. 6 is a flow diagram illustrating method 600 for obfuscating authentication data with a random lifetime limited string (salt) on the client-side (e.g., client device 102a). At 602, client device 102a receives an incoming request to obfuscate authentication data. At 604, client device 102a determines if the "salt" variable has a value. If there is no value present, at 606, client device 102a requests a dedicated server for the value for the "salt" variable. The lifetime of a variable is limited. Client device 102a separately monitors the lifetime of the "salt" variable (e.g., 1 minute). Client device 102a checks the relevance of the "salt" variable. In case of variable aging (e.g., 1 minute has expired since creation of the salt variable), client device 102a requests the dedicated server for a new value of the "salt" variable at 606. At 608, client device 102a receives the new value of the variable "salt" and updates the variable. At 610, client device 102a stores the value of the lifetime of the variable "salt". After verifying, at 612, that the variable "salt" has an up-to-date unexpired value, at 614, client device 102a checks whether the incoming request is an authorization request. If the incoming request is not an authorization request, method 600 ends at 620 where client device 102a does nothing. If the incoming request is an authorization request, at 616, client device 102a combines the value of the "salt" variable with the password value and determines a hash of the concatenated string. At 618, client device 102*a* sends data from the incoming request to central server 114 to check for the presence in the list of weak passwords.

FIG. 7 is a flow diagram illustrating method 700 for obfuscating authentication data with a random lifetime limited string (salt) on the server-side (i.e., central server 114). At 702, an incoming request is received to obfuscate authentication data. At 704, central server 114 determines whether a new value for the "salt" variable needs to be generated on the server-side. If a new value needs to be generated, a new value of the "salt" variable is generated by central server 114 at 706. At 708, central server 114 regenerates the table with the hashes of the "salt"+password pairs. At 710, central server 114 sets a new lifetime counter for the "salt" variable.

If the incoming request at 702 is intended to update the "salt" as determined at 712, central server 114 sends the requester the new value of the "salt" variable at 718. If the incoming request at 702 is intended to check the IP and/or password as determined at 714, central server 114 checks the values in the password/IP databases at 716 and sends the result in the response at 720. Otherwise, method 700 advances to 722, where the request is skipped.

Figure 8:
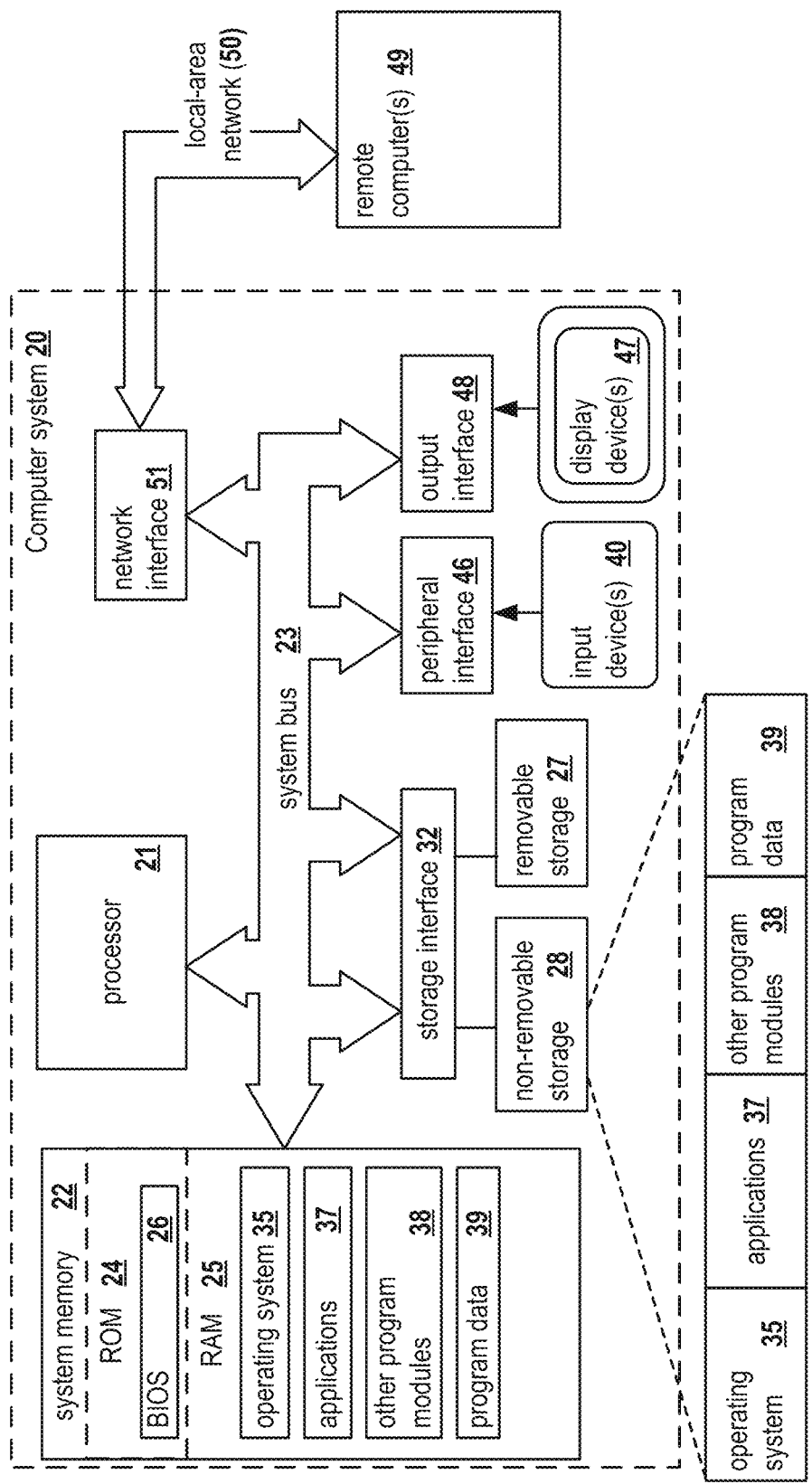
FIG. 8 is a block diagram of a computer system on which the disclosed system and method can be implemented according to an exemplary aspect.

FIG. 8 is a block diagram illustrating a computer system 20 on which aspects of systems and methods for rapidly evaluating passwords and detecting password compromise in accordance with an exemplary aspect. It should be noted that the computer system 20 can correspond to client device 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include Peripheral Component Interconnect (PCI), Instruction Set Architecture (ISA), PCI-Express, HyperTransport™, InfiniBand™, Serial Advanced Technology Attachment (ATA), Inter-Integrated Circuit (I2C), and other suitable interconnects . . . .

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), nano random access memory (NRAM), resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more input/output (I/O) ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, Synchronous Optical Networking (SONET) interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for rapid password evaluation, the method comprising:
   configuring a web application firewall (WAF) to monitor login credentials for one or more web applications;
   intercepting, using the WAF, a password input during a login attempt to a web application by an entity;
   calculating a hash value of the password input;
   transmitting the hash value to a dedicated server configured to:
      determine whether the hash value is in a database of hashes corresponding to weak passwords; and
      in response to determining that the hash value is in the database of hashes, transmit a message to the WAF indicating that the password input corresponds to a weak password;
   generating for display, using the WAF, a web page prompting for a password reset for the web application, and
   wherein the dedicated server is further configured to:
      receive and store, in a record database, an IP address of the entity and information about the login attempt;
      determine, based on entries in the record database, whether the IP address is associated with at least a threshold number of successful login attempts to the web application; and
      in response to determining that the IP address is associated with at least the threshold number, store the IP address in a whitelist.

2. The method of claim 1, wherein the dedicated server is further configured to:
   retrieve, from the record database, information about a first plurality of login attempts made by the entity in the web application for different user profiles; and
   in response to determining that at least a first threshold number of login attempts have been performed by the entity, store the IP address in a blacklist.

3. The method of claim 2, further comprising:
   detecting a subsequent login attempt at the web application or a different web application; and
   in response to determining that the subsequent login attempt is through the IP address in the blacklist, preventing authorization to login successfully.

4. The method of claim 2, wherein the first plurality of login attempts further comprises a subset of login attempts made by the entity in at least one other web application.

5. The method of claim 2, wherein the first plurality of login attempts further comprises a subset of login attempts made by the entity using more than one password from the database of hashes for a single user profile.

6. The method of claim 1, wherein the dedicated server is further configured to:
   prior to determining whether the hash value is in the database of hashes, determining whether the IP address is in the whitelist; and
   in response to determining that the IP address is in the whitelist, transmitting a message to the WAF to enable login without evaluating the password input.

7. The method of claim 6, wherein the dedicated server is further configured to:
    determine whether the database of hashes has been updated with new password hash values since a last login attempt from the IP address in the whitelist; and
    in response to determining that the database of hashes has been updated, compare the hash value to the new password hash values.

8. The method of claim 7, wherein the dedicated server is further configured to:
    determine, based on a comparison, whether the hash value matches the new password hash values; and
    in response to determining that the hash value matches the new password hash values, transmit a message to the WAF indicating that the password input corresponds to a weak password.

9. The method of claim 8, wherein the dedicated server is further configured to:
    in response to determining that the hash value does not match the new password hash values, not perform a password evaluation until the database of hashes is updated.

10. The method of claim 1, wherein the web page redirects to a password reset page of the web application.

11. The method of claim 1, wherein the intercepting occurs prior to logging into the web application.

12. The method of claim 1, wherein calculating the hash value of the password input further comprises obfuscating the password input using a salt value that is concatenated with the password input prior to hashing.

13. The method of claim 12, wherein the salt value has a lifetime after which a new salt value is generated for concatenation with a new password input.

14. A system for rapid password evaluation, the system comprising:
    a hardware processor configured to:
        configure a web application firewall (WAF) to monitor login credentials for one or more web applications;
        intercept, using the WAF, a password input during a login attempt to a web application by an entity;
        calculate a hash value of the password input;
        transmit the hash value to a dedicated server configured to:
            determine whether the hash value is in a database of hashes corresponding to weak passwords; and
            in response to determining that the hash value is in the database of hashes, transmit a message to the WAF indicating that the password input corresponds to a weak password;
        generate for display, using the WAF, a web page prompting for a password reset for the web application, and
        wherein the dedicated server is further configured to:
            receive and store, in a record database, an IP address of the entity and information about the login attempt;
            determine, based on entries in the record database, whether the IP address is associated with at least a threshold number of successful login attempts to the web application; and
            in response to determining that the IP address is associated with at least the threshold number, store the IP address in a whitelist.

15. The system of claim 14, wherein the dedicated server is further configured to:
    retrieve, from the record database, information about a first plurality of login attempts made by the entity in the web application for different user profiles; and
    in response to determining that at least a first threshold number of login attempts have been performed by the entity, store the IP address in a blacklist.

16. The system of claim 14, wherein the dedicated server is further configured to:
    prior to determining whether the hash value is in the database of hashes, determining whether the IP address is in the whitelist; and
    in response to determining that the IP address is in the whitelist, transmitting a message to the WAF to enable login without evaluating the password input.

17. The system of claim 16, wherein the dedicated server is further configured to:
    determine whether the database of hashes has been updated with new password hash values since a last login attempt from the IP address in the whitelist; and
    in response to determining that the database of hashes has been updated, compare the hash value to the new password hash values.

18. A non-transitory computer readable medium storing thereon computer executable instructions for rapid password evaluation, including instructions for:
    configuring a web application firewall (WAF) to monitor login credentials for one or more web applications;
    intercepting, using the WAF, a password input during a login attempt to a web application by an entity;
    calculating a hash value of the password input;
    transmitting the hash value to a dedicated server configured to:
        determine whether the hash value is in a database of hashes corresponding to weak passwords; and
        in response to determining that the hash value is in the database of hashes, transmit a message to the WAF indicating that the password input corresponds to a weak password;
    generating for display, using the WAF, a web page prompting for a password reset for the web application, and
    wherein the dedicated server is further configured to:
        receive and store, in a record database, an IP address of the entity and information about the login attempt;
        determine, based on entries in the record database, whether the IP address is associated with at least a threshold number of successful login attempts to the web application; and
        in response to determining that the IP address is associated with at least the threshold number, store the IP address in a whitelist.

* * * * *